United States Patent [19]

Masaki

[11] Patent Number: 5,530,296

[45] Date of Patent: Jun. 25, 1996

[54] POWER SUPPLY SWITCHING APPARATUS

[75] Inventor: Tateo Masaki, Ichikawa, Japan

[73] Assignee: Uniden Corporation, Japan

[21] Appl. No.: 176,397

[22] Filed: Dec. 30, 1993

[30] Foreign Application Priority Data

Jun. 30, 1993 [JP] Japan ................................ 5-160588

[51] Int. Cl.$^6$ ....................................................... H02J 7/00
[52] U.S. Cl. ............................. 307/75; 307/64; 307/150; 320/2
[58] Field of Search ................................ 307/64, 66, 75, 307/150, 80, 85; 320/2

[56] References Cited

U.S. PATENT DOCUMENTS

| | | | |
|---|---|---|---|
| 4,590,943 | 5/1986 | Paull et al. | 307/150 |
| 4,675,538 | 6/1987 | Epstein | 307/64 |
| 4,709,201 | 11/1987 | Schaefer et al. | 320/2 |
| 5,019,767 | 5/1991 | Shirai et al. | 320/2 |
| 5,191,229 | 3/1993 | Davis et al. | 307/66 |
| 5,287,053 | 2/1994 | Hutchinson | 307/66 |
| 5,347,163 | 9/1994 | Yoshimura | 307/66 |
| 5,381,043 | 1/1995 | Kohiyama et al. | 307/150 |
| 5,404,090 | 4/1995 | Shinbori | 320/2 |

FOREIGN PATENT DOCUMENTS 50-86642  7/1975  Japan.

*Primary Examiner*—William M. Shoop, Jr.
*Assistant Examiner*—Jonathan Kaplan
*Attorney, Agent, or Firm*—Ratner & Prestia

[57] ABSTRACT

A power supply switching apparatus for switching power supplies used to all electronic appliance such as a pager and a portable telephone is described. A battery pack includes a battery and is connectable to an external DC power supply. In the battery pack, a power supply connection detecting circuit detects whether or not the external DC power supply is connected to this battery pack, and a switching circuit switches the battery and the external DC power supply. In an appliance housing a voltage is detected by a voltage detecting circuit to judge whether the detected voltage corresponds to the voltage derived from the battery power supply, or the voltage derived from the external DC power supply, and another switching circuit switches the battery power supply and a power stabilizing circuit. Both of these battery pack and appliance housing constitute the power supply switching apparatus.

8 Claims, 2 Drawing Sheets

POWER SUPPLY SWITCHING APPARATUS

BACKGROUND OF THE INVENTION

1. Field of the Invention

The present invention generally relates to a power supply switching apparatus. More specifically, the present invention is directed to a circuit for switching power supplies to compact pagers, portable telephones and so on.

2. Description of the Prior Art

In recently developed/marketed portable appliances such as pagers and portable telephones, battery packs mounted to housings of these appliances are made compact in connection with the compact of the portable appliances. Conventionally, a rechargeable cell (battery), a power stabilizing circuit, and a switching circuit for switching the rechargeable cell into the power stabilizing circuit when a portable appliance is connected to an external DC power supply, are provided within a battery pack.

However, as described above, the more, the battery pack is made compact, the narrower the space capable of storing the switching circuit and the power stabilizing circuit are available. There is another problem that since heat dissipation of the power stabilizing circuit becomes large, this power stabilizing circuit may not be readily stored in such a compact battery pack. Furthermore, there is another drawback that when the switching circuit and the power stabilizing circuit would be stored within the battery pack, the number of connection terminals for connecting the battery pack with the appliance housing should become large.

SUMMARY OF THE INVENTION

An object of the present invention is to be acceptable for a demand to make a compact battery pack, and is to provide a power supply switching apparatus capable of reducing a total number of connection terminals for connecting a housing of an electronic appliance with a battery pack.

To achieve the above-described object, according to one aspect of the present invention, a power supply switching apparatus comprises a battery power supply, for switching between said battery power supply and an external DC power supply when a voltage from a battery pack connectable to said external DC power supply is applied to a portable appliance to which the battery pack is detachably mounted, the above-described battery pack includes:

means for selecting said battery power supply and said external DC power supply; and means for applying a voltage of said selected power supply to said portable appliance, the above-described portable appliance includes:

means for receiving the voltage applied from said battery pack;

means for detecting whether the received voltage corresponds to the voltage applied from said battery power supply, or the voltage applied from said external DC power supply;

a power stabilizing circuit for stabilizing the voltage from the external DC power supply to output a stabilized voltage; and means for switching between the voltage from said battery power supply and the stabilized voltage from said power stabilizing circuit to output the switched voltage in response to an instruction from said detecting means.

DESCRIPTION OF THE EXEMPLARY EMBODIMENTS

Figure 1:
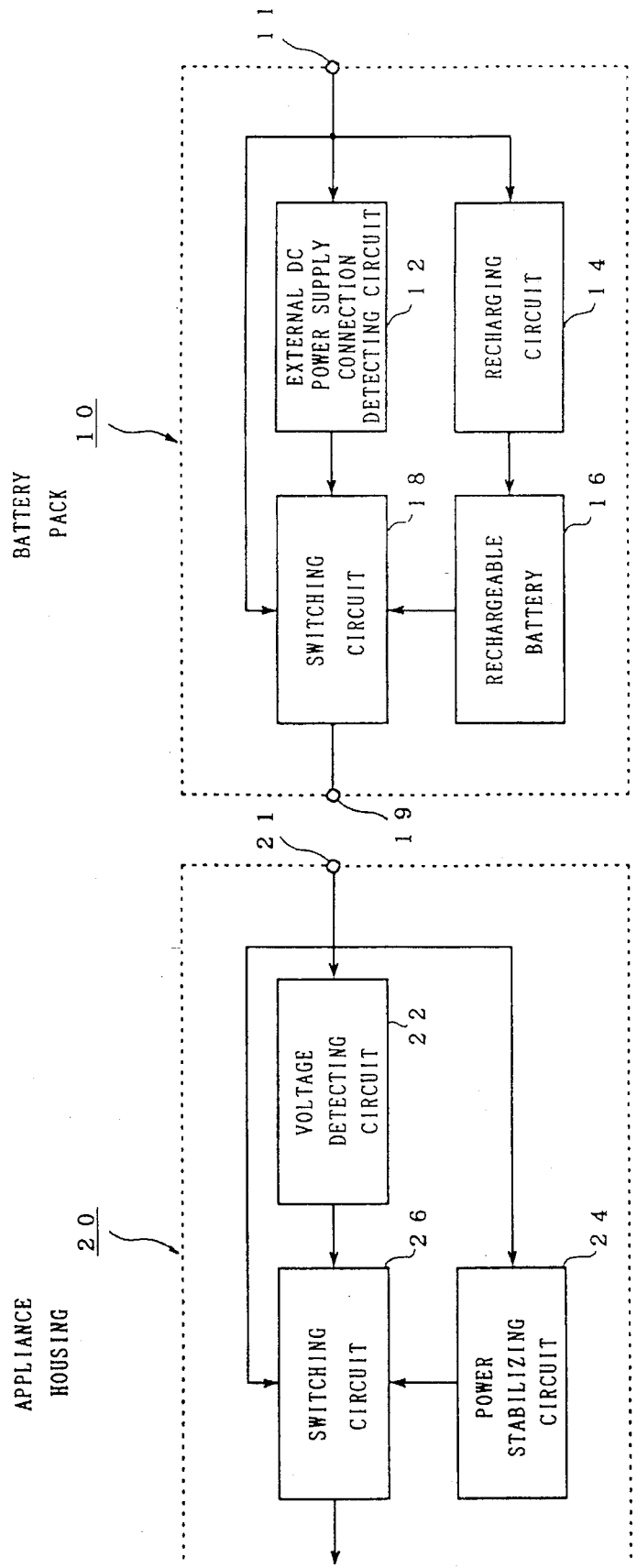
FIG. 1 is a schematic block diagram arrangement of a power supply switching apparatus according to an embodiment of the present invention.

FIG. 1 is a schematic block diagram of a basic circuit arrangement of a power supply switching apparatus according to an exemplary embodiment of the present invention. The power supply switching apparatus is arranged by an external DC power supply connection detecting circuit 12 stored within a battery pack 10, a recharging circuit 14, a rechargeable battery (cell) 16 such as an Nickel-cadmium battery cell, a switching circuit 18, a voltage detecting circuit 22 stored within an appliance housing 20, a power stabilizing circuit 24, and another switching circuit 26.

The battery pack 10 is equipped with a power supply jack 11 connectable to an external DC power supply (not shown). This battery pack 10 is further comprised of a power supply connection terminal 19 which is connected with another power supply connection terminal 21 of the appliance housing 20 when the battery pack 10 is mounted to this appliance housing 20. The power supply connection detecting circuit 12 employed within the battery pack 10 is such a circuit for detecting an electric connection established between the power supply jack 11 and the external DC power supply. Concretely speaking, when a power supply plug is inserted into the power supply jack 11, this insertion is detected by the power supply connection detecting circuit 12. The switching circuit 18 switches power supplied from the rechargeable battery 16 into power supplied from the external DC power supply when the connection of the external DC power supply is detected by the power supply connection detecting circuit 12.

The voltage detecting circuit 22 employed in the appliance housing 20 is a circuit for detecting the voltage of the power supply in order to judge whether the voltage applied via the power supply connection terminal 21 from the battery pack 10 corresponds to the voltage from the battery power source, or the voltage from the external DC power supply. The power stabilizing circuit 24 is such a circuit for stabilizing the input voltage derived from the external DC power supply connected to the battery pack 10 thereby maintaining the constant output voltage even when the power source voltage and/or the load are varied. The switching circuit 26 switches the voltages derived from the the battery 16 and the power stabilizing circuit 24 in response to an instruction supplied from the voltage detecting circuit 22, thereby outputting the switched voltage. With the above described circuit arrangement, when the battery pack 10 is mounted to the appliance housing 20 and the external DC power supply is not connected thereto the switching circuit 18 of the battery pack 10 switches to connect the rechargeable battery 16 in response to the instruction issued from the power supply connection detecting circuit 12, so that the voltage of this battery 16 is applied via the switching circuit 18 and the power supply connection terminal 19 to the power supply connection terminal 21 of the appliance housing 20. On the other hand, when the external DC power supply is connected to the battery pack 10, the switching circuit 18 switches the battery 16 into the external DC power supply in response to another instruction derived from the power supply connection detecting circuit 12, whereby the voltage of the external DC power supply is supplied via this switching circuit 18 and the power supply connection terminal 19 to the power supply connection terminal 21 of the appliance housing 20. The voltage detecting circuit 22 of the appliance housing 20 detects the voltage of the power supply connection terminal 21 to judge whether the detected voltage corresponds to the voltage derived from the external DC power supply, or the voltage derived from the battery 16, so that the switching circuit 26 may be controlled based upon the judgement result. Under control of the voltage detecting circuit 22 the switching circuit 26 switches to the power stabilizing circuit 24 when the voltage derived from the external DC power supply is received, and switches to the power supply connection terminal 21 when the voltage derived from the battery 16 is received. The switching circuit 26 applies either the voltage from the battery 16, or the voltage from the power stabilizing circuit 24 to a predetermined circuit within the appliance housing 20.

Figure 2:
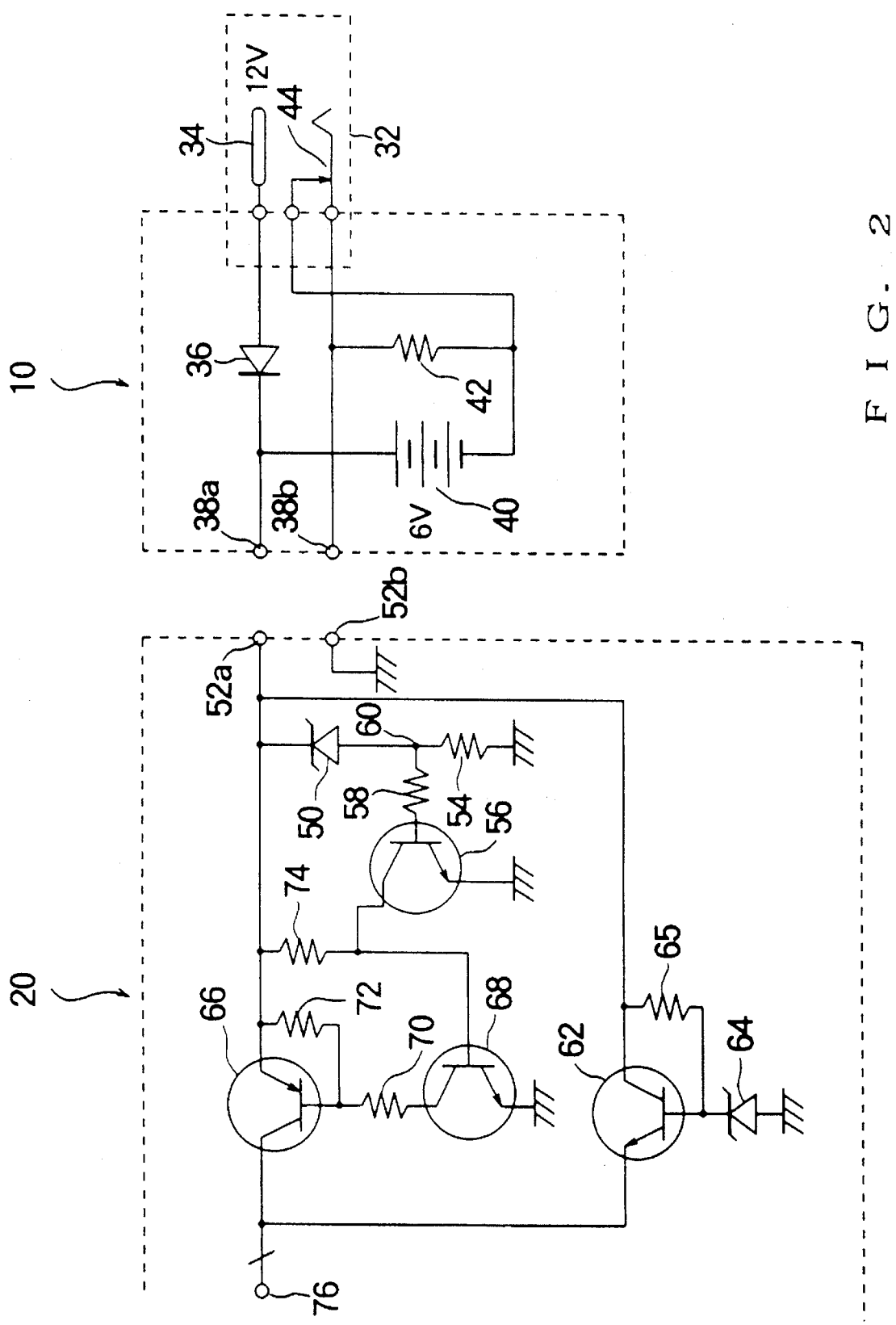
FIG. 2 is a concrete circuit diagram of the power supply switching apparatus shown in FIG. 1.

FIG. 2 represents one example of a concrete circuit arrangement of the power supply switching apparatus shown in FIG. 1.

The battery pack 10 is equipped with a jack 32 having a switch whose plus-sided contact 34 is connected to an anode of a reverse connection preventing diode 36. A cathode of this diode 36 is connected to a plus sided connection terminal 38a. A minus-sided contact 35 of this jack 32 is connected to a minus-sided connection terminal 38b. A cathode of the diode 36 is connected to a plus-sided terminal of the Nickel-cadmium battery 40. A minus-sided terminal of the battery 40 is connected to one end of a recharging resistor 42. The other end of this recharging resistor 42 is connected to the minus-sided contact of the jack 32. A switch 44 of the jack 32 is connected parallel to the recharging resistor 42. This switch 44 owns such a construction that when the external DC power source plug (not shown in detail) is inserted into the jack 32, this switch 44 is opened, whereas when this plug is pulled out from the jack 32, this switch 44 is closed.

With respect to the above-described construction of the battery pack 10, the jack with switch 32 corresponds to the power supply connection detecting circuit 12 and the switching circuit 18, the recharging resistor 42 corresponds to the recharging circuit 14 of FIG. 1, and the connection terminals 38a and 38b correspond to the power supply connection terminal 19 of FIG. 1.

On the other hand, the appliance housing 20 comprises a zener diode 50 whose cathode is connected to a plus-sided connection terminal 52a. An anode of this zener diode 50 is grounded via a resistor 54. A junction 60 between this anode and the resistor 54 is connected via a resistor 58 to a base of an NPN transistor 56. An emitter of this NPN transistor 56 is grounded, and a collector thereof is connected to a base of another NPN transistor 68, and also via a resistor 47 to the plus-sided connection terminal 52b of this appliance body 20.

An emitter of the transistor 68 is grounded, and a collector thereof is connected via a resistor 70 to a base of a PNP transistor 66. An emitter of this transistor 66 is connected to the plus-sided connection terminal 52a, and a collector thereof is connected to a voltage supply terminal 76. A resistor 72 is connected between the base of the transistor 66 and the emitter thereof.

The appliance housing 20 further includes an NPN transistor 62 whose collector is connected to the plus-sided connection terminal 52a and whose emitter is connected to the voltage supply terminal 76. A base of this transistor 62 is connected to a cathode of another zener diode 64, the emitter of which is grounded. A resistor 65 is connected between the base of the transistor 62 and the collector thereof.

With respect to the above-described circuit arrangement of the appliance housing 20, the circuit arrangement constructed of the zener diode 50, transistor 56, and resistors 54, 58 corresponds to the voltage detecting circuit 22 of FIG. 1. Another circuit arrangement constructed of the transistor 62, zener diode 64, and resistor 65 corresponds to the power stabilizing circuit 24, a circuit arrangement arranged by the transistor 66, transistor 68, and resistors 70, 72 corresponds to the switching circuit of FIG. 1, and the connection terminals 52a and 52b correspond to the power supply connection terminal 21 of FIG. 1.

In the power supply switching apparatus shown in FIG. 1, it is selected that the external DC power supply is DC 12 V, the Nickel-cadmium battery 40 is DC 6 V, and the output voltage of the power stabilizing circuit is DC 6 V. At this time, a zener voltage of the zener diode 50 of the voltage detecting circuit is selected to be DC 8 V.

Operations of the power supply switching apparatus shown in FIG. 2 will now be explained. When the rechargeable battery 40 of the battery pack 10 is recharged, the battery back 10 is released, or dismounted from the appliance housing 20, and then the external DC power source plug is inserted into the jack 32. When this power source plug is inserted into the jack 32, the switch contact 44 of this jack 32 is opened to form a loop circuit of the plus-sided contact 34, diode 36, battery 40, recharging resistor 42, and minus-sided contact 35, so that the battery 40 is brought into the recharging condition.

Subsequently, power supply switching operations under such condition that the battery pack 10 is mounted to the appliance housing 20 will now be described. When the battery pack 10 is mounted on the appliance housing 20, the connection terminals 38a, 38b are connected to the connection terminals 52a, 52b. When the external DC power supply plug has not yet been inserted into the jack 32, the switch 44 is closed and the battery 40 is connected to the connection terminals 38a and 38b. Accordingly, a DC voltage of 6 V is applied between the connection terminals 52a and 52b of the appliance body 20.

Since the voltage applied from the battery 40 is lower than the zener voltage of 8 V, the zener diode 50 of the voltage detecting circuit in the appliance housing 20 is under OFF state. Therefore, the transistor 56 is turned OFF, so that the transistor 68 of the switching circuit 26 is turned ON and the transistor 66 is turned ON. As a result, the voltage of the battery 40 is output from the voltage supply terminal 76.

When the external DC power source plug is inserted into the jack 32, the switch 44 is opened and then the voltage is applied across the connection terminals 38a and 38b, namely the connection terminals 52a and 52b of the appliance housing 20. As previously stated since the voltage of the external DC power supply is selected to be DC 12 V the zener diode 50 of the voltage detecting circuit is turned ON and the transistor 56 is also turned ON. As a result, the transistor 68 of the switching circuit is turned OFF and the transistor 66 is turned OFF.

On the other hand, the DC voltage of 12 V derived from the external DC power supply is applied via the connection terminals 52a and 52b to the zener diode 64 and the resistor 65 of the power stabilizing circuit. Due to the constant voltage characteristic of the zener diode 64, the stabilized DC 6 V may be applied to the voltage supply terminal 76. Then, the DC voltage output from the voltage supply terminal 76, is supplied to a predetermined circuit arrangement of the appliance housing 20.

In accordance with the embodiment of the present invention, since only the battery, recharging resistor and diode are employed in the battery pack, a demand for compactness can be satisfied. A total number of power supply connection terminals used to connect the appliance housing with the battery pack is only 2, so that the quantity of the power supply connection terminals can be considerably reduced, as compared with that of the conventional power supply switching apparatus which contains the power stabilizing circuit and the switching circuit within battery pack.

While the present invention has been described using a specific embodiment, it should be understood that further modifications and changes can be made without departing from the scope of the present invention.

The Invention claimed is:

1. A power supply switching apparatus for a portable appliance for switching between a battery power supply and an external DC power supply, the battery power supply being housed in a battery pack, the battery pack providing a voltage to the portable appliance to which the battery pack is removably mounted, the apparatus comprising:

first apparatus located in said battery pack including:
 means for connecting said battery pack to said external DC power supply;
 means for selecting one of said battery power supply and said external DC power supply; and
 means for applying a voltage of said selected power supply to said portable appliance, and second apparatus located in said portable appliance including;
 means for receiving the voltage applied from said battery pack;
 means for detecting whether the received voltage corresponds to the voltage applied from said battery power supply, or the voltage applied from said external DC power supply;
 a power stabilizing circuit for stabilizing the voltage from the external DC power supply to output a stabilized voltage; and
 means for switching between the voltage from said means for receiving and the stabilized voltage from said power stabilizing circuit to output the switched voltage in response to an instruction from said detecting means.

2. A power supply switching apparatus for a portable appliance for switching between a battery power supply and an external DC power supply , the battery power supply being housed in a battery pack, the battery pack providing a voltage to the portable appliance to which the battery pack is removably mounted, the apparatus comprising:

first apparatus located in said battery pack including:
 means for connecting said battery pack to said external DC power supply,
 power supply connection detecting means for detecting whether or not said external DC power supply is connected to said battery pack;
 first switching means for switching between said battery pack supply and said external DC power supply in response to an instruction issued from said power supply connection detecting means; and
 means for applying the voltage of said switched power supply to said portable appliance; and, second apparatus located in said portable appliance including;
 means for receiving the voltage applied from said battery pack;
 means for detecting whether the received voltage corresponds to the voltage applied from said battery power supply, or the voltage applied from said external DC power supply;
 a power stabilizing circuit for stabilizing the voltage from the external DC power supply to output a stabilized voltage; and
 means for switching between the voltage from said means for receiving and the stabilized voltage from said power stabilizing circuit to output the switched voltage in response to an instruction from said means for detecting means.

3. A power supply switching apparatus for a portable appliance for switching between a battery power supply and an external DC power supply, the battery power supply being housed in a battery pack, the battery pack providing a voltage to the portable appliance to which the battery pack is removably mounted, said apparatus comprising:

first apparatus located in said battery pack including:
 means for connecting said battery pack to said external DC power supply;
 a power supply connection detecting circuit for detecting a connection of said external DC power supply to said battery pack;
 a first switching circuit for switching between said battery power supply and said external DC power supply in response to an instruction issued from said power supply connection detecting circuit to output one of said voltages derived from said battery power supply and said external DC power supply; and
 a first connection terminal for supplying the voltage output from said switching circuit to said portable appliance; and, second apparatus located in said portable appliance including;
 a second connection terminal connected to said first connection terminal;
 a voltage detecting circuit for detecting whether a voltage applied from said battery pack to said second terminal corresponds to the voltage derived from said battery power supply, or the voltage derived from said external DC power supply;
 a power stabilizing circuit for stabilizing the voltage applied to said second connection terminal to output a constant voltage; and
 a second switching circuit for switching between said second connection terminal and said power stabilizing circuit in response to an instruction issued from said voltage detecting circuit, and for applying the constant voltage derived from one of said second connection terminal and said power stabilizing circuit to a predetermined power source circuit of said portable appliance.

4. A power supply switching apparatus as claimed in claim 3, wherein:

said external DC power supply connection detecting circuit and said first switching circuit are constructed of a jack with a switch, wherein the jack receives a power supply plug by which said external DC power supply is connected to said battery pack; and when said power supply plug is inserted into said jack, said switch is opened, thereby connecting said external DC power supply to said first connection terminal, and when said power supply plug is not connected to said jack, said switch is closed, thereby connecting said battery to said first connection terminal.

5. A power supply switching apparatus for a portable appliance for switching between a battery power supply and an external DC power supply, the battery power supply being housed in a battery pack, the battery pack providing a voltage to the portable appliance to which the battery pack is removably mounted, wherein:

said battery pack comprises:
  a jack with a switch, said jack receiving a power supply plug for connecting said external DC power supply to said battery pack, said jack having a plus-sided contact and a minus-sided contact, said switch connecting the minus-sided contact to a minus polarity of said power supply, said switch being opened when said power supply plug is inserted into said jack, and said switch being closed when said power supply plug is not connected to said jack;
  a first plus-sided connection terminal connected to said plus-sided contact of said jack and a positive polarity of said battery power supply; and
  a first minus-sided connection terminal connected to said minus-sided contact of said jack and a positive polarity of said battery power supply; and said portable appliance comprises:
  a second plus-sided connection terminal connected to said first plus-sided connection terminal;
  a second minus-sided connection terminal connected to said first minus-sided connection terminal;
  a voltage detecting circuit including a series circuit constructed of a zener diode and a resistor, said series circuit connecting said second plus-sided connection terminal to said second minus-sided connection terminal, for detecting whether a voltage applied from said battery pack to said second plus-sided connection terminal and said second minus-sided connection terminal, corresponds to the voltage derived from said battery power supply, or the voltage derived from said external DC power supply;
  a power stabilizing circuit connected to said second plus-sided connection terminal and said second minus-sided connection terminal, for stabilizing the voltage applied from said battery pack via said plus-sided connection terminal and said second minus-sided connection terminal; and
  a switching circuit for switching between the voltage on said second plus-sided connection terminal and said second minus-sided connection terminal, and the output voltage from said power stabilizing circuit, thereby outputting one of said switched voltages.

6. A power supply switching apparatus as claimed in claim 5, wherein a recharging resistor connects the negative polarity of said battery and said minus-sided contact.

7. A power supply switching apparatus as claimed in claim 5, wherein a zener voltage of said zener diode is selected to be an intermediate voltage between the voltage of said battery power supply and the voltage of said external DC power supply.

8. A power supply switching apparatus for a portable appliance for switching between a battery power supply and an external DC power supply, the battery power supply being housed in a battery pack, battery pack providing a voltage to the portable appliance to which the battery pack is removably mounted, the apparatus comprising:

first apparatus located in said battery pack including:
  means for connecting said battery pack to said external DC power supply;
  an external DC power supply connection detecting circuit for detecting whether the external DC power supply is connected to said battery pack;
  a recharging circuit for recharging said battery power supply housed in said battery pack when said external DC power supply is connected to said battery pack;
  a switching circuit, responsive to said external DC power supply connection detecting circuit, for switching between said external DC power supply and said battery supply and for providing one of said external DC power supply and said battery supply to said portable appliance; and second apparatus located in said portable appliance including:
  a voltage detecting circuit for receiving a voltage from said battery pack and detecting whether the source of the voltage is said external DC power supply or said battery supply;
  a power stabilizing circuit for stabilizing the voltage from said external DC power supply and providing a stabilized voltage; and
  a switching circuit, responsive to said voltage detecting circuit, for switching between said voltage from said battery pack and said stabilized voltage and providing one of said voltage from said battery pack and said stabilized voltage to circuitry within said portable appliance.

* * * * *